United States Patent
Hanabusa et al.

[11] Patent Number: 5,366,240
[45] Date of Patent: Nov. 22, 1994

[54] AIR BAG DEVICE INCLUDING A TWO PIECE CASING

[75] Inventors: Hisao Hanabusa; Kazumi Ichimaru; Yuji Kuriyama; Masao Ando, all of Aichi, Japan

[73] Assignee: Toyoda Cosei Co., Ltd., Nishikasugai, Japan

[21] Appl. No.: 40,364

[22] Filed: Mar. 30, 1993

[30] Foreign Application Priority Data

Apr. 10, 1992 [JP] Japan ............... 4-091102

[51] Int. Cl.⁵ .............................................. B60R 21/16
[52] U.S. Cl. .............................. 280/728 A; 220/327
[58] Field of Search ........... 280/728 R, 728 A, 728 B, 280/730 R, 732, 736, 741; 220/327; 403/338, 393

[56] References Cited

U.S. PATENT DOCUMENTS

| | | | |
|---|---|---|---|
| 795,319 | 7/1905 | Vanderman | 220/327 |
| 933,661 | 9/1909 | Paiste | 220/327 |
| 5,087,067 | 2/1992 | Seki et al. | 280/728 A |
| 5,209,519 | 5/1993 | Shiga et al. | 280/728 A |
| 5,217,249 | 6/1993 | Kokeguchi | 280/728 R |

FOREIGN PATENT DOCUMENTS

| | | | |
|---|---|---|---|
| 878900 | 2/1943 | France | 220/327 |
| 3-143751 | 6/1991 | Japan | 280/728 B |
| 4-50054 | 2/1992 | Japan | |

Primary Examiner—Karin L. Tyson
Attorney, Agent, or Firm—Cushman, Darby & Cushman

[57] ABSTRACT

An air bag device is provided including an air bag 1, an inflator 5, and a casing 7 including an upper case member and a lower case member, surrounding the air bag and the inflator. The lower case member 16 and auxiliary plates 18 form fitting recesses 17 at the connecting portion 16a of the lower case member which open upwardly. Tongue pieces 10 are formed at the connecting portion 9a of the upper case member near the gas jetting outlets 6 of the inflator in such a manner that they are extended downwardly from the upper case member. The tongue pieces 10 are inserted into the fitting recesses 17 to form the casing. The auxiliary plates 18 are pushed against the tongue pieces 10 by the pressure of gas jetted from the gas jetting outlets 6.

5 Claims, 3 Drawing Sheets

AIR BAG DEVICE INCLUDING A TWO PIECE CASING

BACKGROUND OF THE INVENTION

This invention relates to an air bag device which is provided, for instance, at the passenger's seat in an automobile.

A conventional air bag device of this type comprises an air bag which is folded up and accommodated therein; an inflator for supplying gas into the air bag; and a casing surrounding and supporting the air bag and the inflator.

To facilitate combining the air bag and the inflator with the casing, the casing is made up of two parts, namely, an upper case and a lower case.

The conventional air bag device whose casing is made up of the upper and lower cases suffers from the following difficulties. Upon inflation of the air bag, the casing is greatly shocked, so that the upper and lower cases may be deformed at the coupling parts thereof. Thus, the sealing of the casing may be impaired. The casing is most greatly shocked near the gas jetting outlets of the inflator adapted to supply gas to the air bag, and therefore, the above-described difficulty is most likely to occur near the gas jetting outlets of the inflator.

Hence, in the conventional air bag device having a casing comprised of the upper and lower cases, the wall thickness of those cases is increased, or reinforcing ribs or flanges are employed, to increase the mechanical strength of the portion of the casing which is located near the gas jetting outlets of the inflator.

However, increasing the wall thickness of the cases, or providing the reinforcing ribs or flanges results in an increase in weight of the casing.

SUMMARY OF THE INVENTION

An object of this invention is to eliminate the above-described difficulties accompanying a conventional air bag device. More specifically, an object of the invention is to provide an air bag device in which the weight of the casing is minimized, and wherein the sealing of the connecting parts of the upper and lower cases of the casing is prevented from being impaired near the gas jetting outlets of the inflator, and in which the upper case and the lower case can be combined easily during assembly of the device.

The foregoing object of the invention has been achieved by the provision of an air bag device comprising an air bag disposed in a folded-up condition; an inflator having gas jetting outlets for supplying gas into the air bag; and a casing surrounding the air bag and the inflator, the casing being comprised of an upper case member and a lower case member.

Auxiliary plates are coupled to the inner peripheral surface of the lower case member in such a manner that upper end portions of the auxiliary plates are disposed away from the lower case member, and are provided at the connecting part of the lower case member near the gas jetting outlets of the inflator, in such a manner that the lower case member and the auxiliary plates form fitting recesses which open upwardly.

Tongue pieces are provided at the connecting part of the upper case member near the gas jetting outlets of the inflator in such a manner that the tongue pieces extend downwardly from the upper case member. The tongue pieces are inserted into the fitting recesses to couple the upper case member to the lower case member.

In inflation of the air bag, the gas is jetted from the gas jetting outlets of the inflator, so that the auxiliary plates forming the fitting recesses are deformed by the gas pressure in such a manner that they are pushed toward the tongue pieces.

That is, the auxiliary plates are pushed against the tongue pieces, and therefore, the sealing of the casing is positively maintained at the connecting parts of the upper case and the lower case near the gas jetting outlets of the inflator.

In the air bag device of the invention, the sealing of the casing is positively maintained at the connecting parts of the upper case member and the lower case member near the gas jetting outlets of the inflator merely by providing the tongue pieces for the upper case member and providing the auxiliary plates for the lower case member. This will contribute to reduce the weight of the casing. It is essential that the auxiliary plates are deformable. For this purpose, the auxiliary plates should be as thin as possible. This will also contribute to reduce the weight of the casing, and accordingly, the weight of the air bag device.

The tongue pieces are vertically inserted into the fitting recesses; that is, the direction of insertion of the tongue pieces is the same as the direction in which the upper case member and the lower case member are moved so as to be joined together. Hence, the tongue pieces can be readily inserted into the fitting recesses. In addition, by inserting the tongue pieces into the fitting recesses, the upper and lower case members are properly aligned. Thus, the assembling of the upper case member and the lower case member can be achieved efficiently.

In addition, the tongue pieces and the fitting recesses are extended vertically of the casing without significantly horizontally protruding therefrom. Hence, they will not obstruct the work of connecting the air bag and the inflator to the casing, and the space in the casing can be effectively utilized.

DETAILED DESCRIPTION OF THE PREFERRED EMBODIMENTS

Preferred embodiments of this invention will be described with reference to the accompanying drawings.

Figure 1:
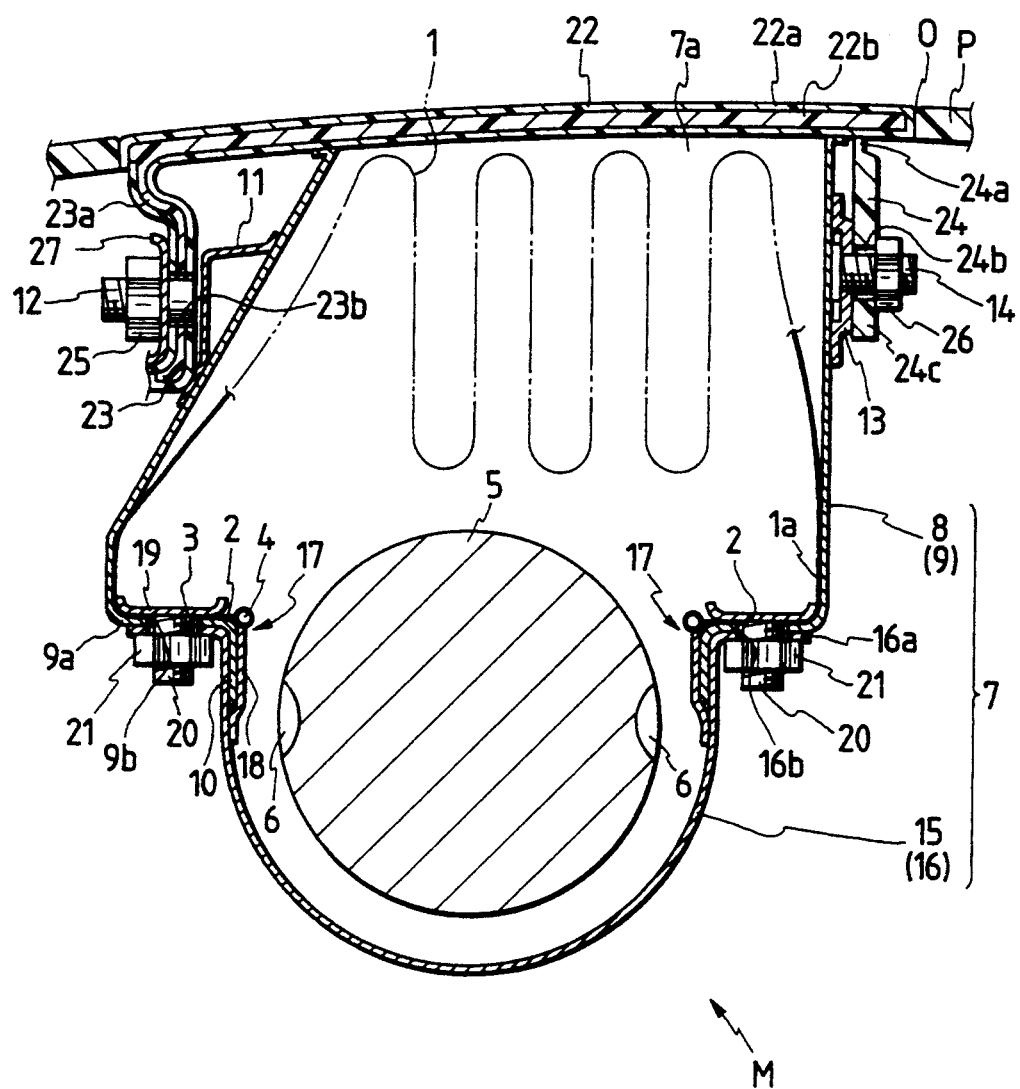
FIG. 1 is a sectional view of an air bag device mounted on an instrument panel, which constitutes a first embodiment of this invention.

As shown in FIG. 1, an air bag device M, which constitutes a first embodiment of the invention, is installed on an automobile with its lid 22 engaged with an opening O in the instrument panel in front of the passenger seat.

The air bag device M comprises: an air bag 1 which has been folded up; an inflator 5 with gas jetting outlets 6 for supplying gas into the air bag 1; a casing 7 surrounding the air bag 1 and the inflator 5; and the aforementioned lid 22 which is secured to the casing 7 to cover the opening 7a of the casing 7.

The casing 7 is substantially in the form of a box; that is, it is made up of an upper case 8 and a lower case 15 which are made of a metal plates.

Figure 2:
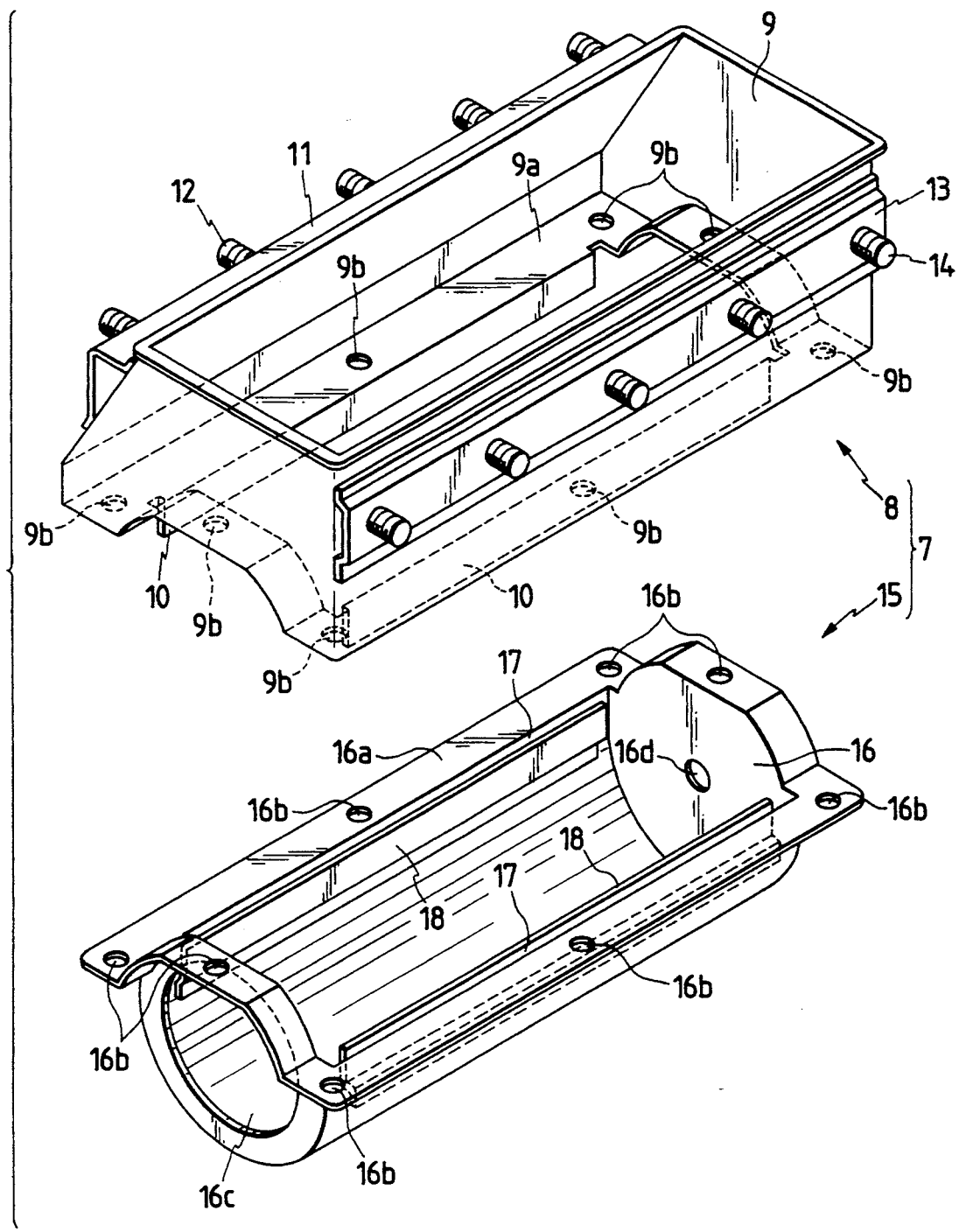
FIG. 2 is a perspective view of an upper case and a lower case forming the air bag device shown in FIG. 1.

The upper case 8, as shown in FIGS. 1 and 2, comprises a upper case member 9 substantially in the form of a box. The upper case member 9 has a flange 9a at a bottom thereof. More specifically, the flange 9a extends horizontally and inwardly from the entire edge of the lower opening of the member 9. The flange 9a is used to connect the upper case 8 to the lower case 15, and has a plurality of mounting holes 9b at predetermined positions.

The flange 9a has tongue pieces 10 which extend downwardly from the edges of two opposed portions of the flange 9a, which are confronted with the gas jetting outlets 6 of the inflator 5 (the opposed portions being protruded laterally of the upper case 8 in the embodiment).

A bracket 11 has a plurality of bolts 12 projecting therefrom, and a bracket 13 has a plurality of bolts 14 also projecting therefrom. The brackets 11 and 13 are welded to two opposed sides of the upper case member 9 and extend longitudinally of the case member, respectively. Brackets 11 and 13 are used to secure the lid 22.

The lower case 15, as shown in FIGS. 1 and 2, comprises a lower case member 16 which is substantially in form of a box having a semi-cylindrical bottom. The lower case member 16 has a flange 16a which extends horizontally and outwardly from the entire edge of the upper opening of the member 16. The flange 16a is used to engage with the upper case 8, and has a plurality of mounting holes 16b disposed at predetermined positions. Auxiliary plates 18 of metal are set at two opposed portions of the flange 16a which are confronted with the gas jetting outlets 6 of the inflator 5. More specifically, the auxiliary plates 18 are held upright with the lower ends welded to the lower case member 16. The lower case member 16 and the auxiliary plates 18 form fitting recesses 17, into which the tongue pieces 10 are inserted.

The gas jetted from the gas jetting outlets 6 of the inflator 5 flows horizontally, and its pressure is considerably high. Hence, it is desirable that the flanges 9a and 16a and the auxiliary plates 18, which are used for engagement of the upper case 8 and the lower case 15, are positioned above the gas jetting outlets 6 of the inflator 5 which is mounted on the casing 7.

The lower case 15 has two side walls in the longitudinal direction of the lower case member 16. One of the two side walls has a mounting hole 16c large in diameter, and the other has a mounting hole 16d small in diameter. Those mounting holes 16c and 16d are used to mount the inflator 5.

The air bag 1 is in the form of a bag having an opening 1a at the bottom thereof. A flange 2 is provided along the opening 1a in such a manner that it extends inwardly from the whole edge of the opening 1a. The flange 2 is secured to the flanges 9a and 16a of the casing 7, and has mounting holes 3 which correspondence to the mounting holes 9b and 16b. The flange 2 has a core member 4 along its inner periphery; more specifically, the inner peripheral portion of the flange 2 is bent over the core member 4 so that the flange 2 may be removed from the casing 7 after being secured thereto.

The inflator 5 is substantially cylindrical, and has a plurality of gas jetting outlets 6 on its opposed sides.

More specifically, the gas jetting outlets 6 are arranged in the axial direction of the inflator 5. The inflator 5 has a bolt (not shown) on its front end face, and a flange (not shown) on its rear end face. The inflator 5 thus constructed is secured to the casing 7 as follows: The front end face of the inflator 5 is inserted into the large diameter mounting hole 16c of the lower case 15 until a bolt (not shown) protrudes through the small diameter mounting hole 16d, and the flange (not shown) on the rear end face of the inflator engages with the peripheral portion of the large diameter mounting hole 16c. Under this condition, a nut is engaged with the bolt (not shown) on the front end face of the inflator 5. Thus, the inflator 5 has been fixedly mounted on the casing 7. In this operation, when necessary, seal rings are disposed on the peripheries of the mounting holes 16c and 16d.

The lid 22 is made of synthetic resin; more specifically, it comprises: a facing layer 22a of a hard synthetic resin such as polyproplene which is the same as the material of the instrument panel P; and a core member 22b made of thermoplastic elastomer of a styrene or olefin group which is high in flexibility at low temperatures. The lid 22 has a bracket 23 at one end, and a break-away member 24 on the other end. The bracket 23 is secured to the bracket 11 of the casing 7 with nuts 25. The break-away member 24 is secured to the bracket 13 of the casing 7 with nuts 26 in such a manner that it can be broken off.

In FIG. 1, reference character 23b designates mounting holes into which the bolts 12 of the bracket 11 are inserted; 24a, a thin portion which is to be broken (hereinafter referred to as "a breaking portion 24a", when applicable); 24b, mounting holes into which the bolts 14 of the bracket 13 are inserted. Each of the mounting holes 24b is in the form of a key hole, having a slit 24c which becomes larger at an end thereof. Further, in FIG. 1, reference character 23a designates a hinge portion which, when the air bag inflates, (when the lid 22 opens with the breaking portion 14a broken) serves as the center of rotation.

The installation of the air bag device M thus constructed will be described. First, the upper case 8 and the lower case 15 are combined together to form the casing 7, and then the air bag 1 is coupled to the casing 7.

More specifically, with the flanges 9a and 16a of the upper case and the lower case disposed so as to confront each other, the tongue pieces 10 are inserted into the respective fitting recesses 17. Thereafter, a retainer 19 is placed on the flange 2 of the air bag. The retainer 19 is substantially in the form of a rectangular ring, and has a plurality of bolts 20. The bolts 20 are inserted into the mounting holes 3 of the air bag 1, and the mounting holes 9b and 16b of the flanges 9a and 16a, and are then tightened with nuts 21.

Under this condition, the inflator 5 is installed by using the mounting holes 16c and 16d as was described above, and the air bag 1 is folded up.

Thereafter, the lid 22 is mounted on the casing 7 as follows: The mounting holes 23b are engaged with the bolts 12, and stiffening plates 27 are mounted on the bolts. Under this condition, the nuts 25 are engaged with the bolts 12 so that the bracket 23 is fixedly secured to the bracket 11 of the upper case 8. The mounting holes 24b are externally engaged with the bolts 14 with the slits 24c being pushed radially of the bolts 14, and the break-away portion 14a is secured to the bracket 13 of the upper case 8 with nuts 26. Thus, the air bag device M has been assembled.

The air bag device M is installed on the vehicle as follows: With the lid 22 of the air bag device M set in the opening O of the instrument panel P, a bracket (not shown) provided for the lower case 15 is utilized to install the air bag device M.

After the installation of the air bag device M, and when the air bag 1 is inflated by the gas jetted from the gas jetting outlets 6 of the inflator 5, the auxiliary plates 18 forming the fitting recesses 17 are deformed by the gas pressure in such a manner that they are pushed toward the tongue pieces 10.

As a result, the auxiliary plates 18 are pushed against the tongue pieces 10, and therefore, the sealing of the casing is positively maintained at the connecting parts of the upper case 8 and the lower case 15 near the gas jetting outlets 6 of the inflator 5. As the air bag 1 is inflated, the breaking portion 24a of the break-away member 24 of the lid 22 is broken, so that the lid 22 is opened while turning about the hinge portion 23a. Thus, the air bag 1 is greatly inflated over the instrument panel P.

In the embodiment, the sealing of the casing is positively maintained at the connecting parts of the upper case 8 and the lower case 15 near the gas jetting outlets 6 of the inflator 5 merely by providing the tongue pieces 10 for the upper case 8 and providing the auxiliary plates 18 for the lower case 15. This contributes to reducing the weight of the casing 7. It is essential that the auxiliary plates 18 are deformable. Therefore, the auxiliary plates should be as thin as possible. This will also contributes to reducing the weight of the casing, and accordingly the weight of the air bag device M.

The tongue pieces 10 are vertically inserted into the fitting recesses 17; that is, the direction of insertion of the tongue pieces is the same as the direction in which the upper case 8 and the lower case 15 are moved so as to be combined together. Hence, the tongue pieces can be readily inserted into the fitting recesses. In addition, by inserting the tongue pieces into the fitting recesses, the upper and lower cases are positioned. Thus, the upper case 8 and the lower case 15 can be combined together with high work efficiency.

Furthermore, in the embodiment, the bolts 20 for combining the upper case 8 and the lower case 15 are extended vertically, and therefore, the assembling work of the two cases 8 and 15 may be readily automated.

In addition, the tongue pieces 10 and accordingly the fitting recesses 17 extend vertically of the casing 7, without substantially horizontally protruding therefrom. Hence, they will not obstruct the work of connecting the air bag 1 and the inflator 5 to the casing 7, and the space in the casing 7 can be effectively utilized.

Figure 3:
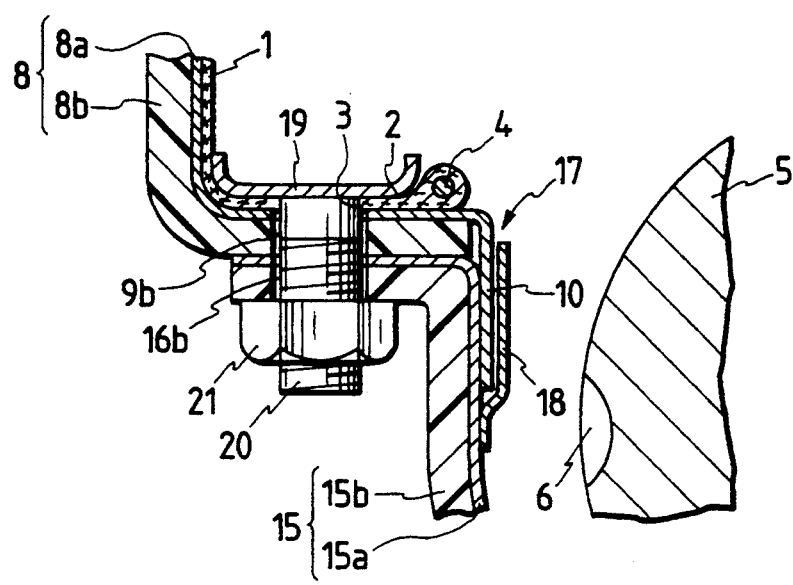
FIG. 3 is a sectional view showing a portion of another example of the air bag device, which constitutes a second embodiment of the invention.

In the above-described embodiment, the upper case 8 and the lower case 15 are made of a metal plate. However, in order to further reduce the weight of the casing 7, the upper case 8 and the lower case 15 may be formed as shown in FIG. 3. That is, they may be made of inner thin layers, namely, metal layers 8a and 15a of iron, aluminum alloy or magnesium alloy, and outer layers, namely, synthetic resin layers 8b and 15b of polycarbonate or the like high in shock resistance, respectively.

Figure 4:
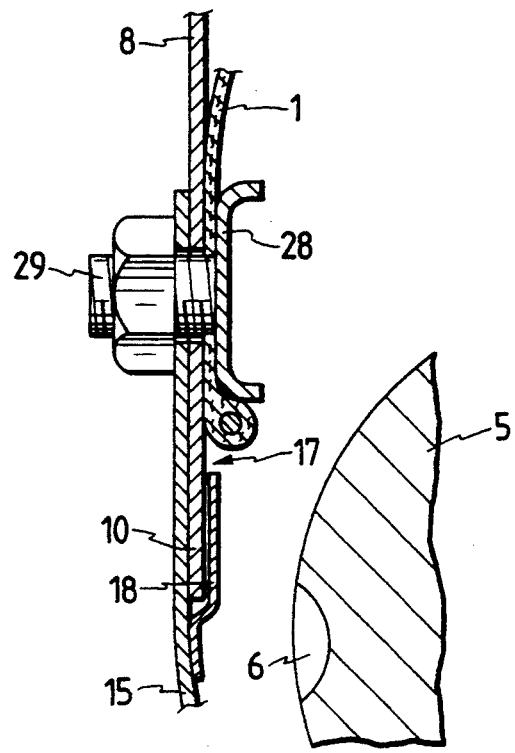
FIG. 4 is a sectional view showing a portion of another example of the air bag device, which constitutes a third embodiment of the invention.

Furthermore, in the above-described embodiment, the upper case 8 and the lower case 15 are coupled through the flanges 9a and 16a to each other. However, the invention is not limited thereto or thereby. That is, the flanges may be eliminated, and instead, as shown in FIG. 4, a retainer 28 having bolts 29 may be provided laterally to couple the upper case 8 and the lower case 15 to each other with the bolts 29.

Moreover, in the above-described embodiment, the tongue pieces 10 and the auxiliary plates 18 are provided only at the portions of the upper case 8 and the lower case 15 which confront with the gas jetting outlets 6 of the inflator 5. However, it can be appreciated that the tongue pieces 10 and the auxiliary plates 18 may also be provided at the opposed ends of the lower case 15 where the mounting holes 16c and 16d for mounting the inflator 5 are formed.

In addition, in the above-described embodiment, the air bag 1 is fixedly connected to the connecting parts of the upper and lower cases 8 and 15 with the bolts 20 of the retainer 19; however, the invention is not limited thereto or thereby. That is, the air bag 1 may be connected to another part of the upper case 8 with a suitable retainer.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An air bag device comprising:
    an air bag disposed in a deflated condition;
    an inflator having a gas jetting outlet for supplying gas into said air bag to inflate said air bag;
    a case including an upper case member and a lower case member, said upper case member having a chamber for accommodating said air bag and a flange portion extending inwardly from a lower end of said upper case member, said lower case member having a receiving chamber for receiving said inflator and a flange portion extending outwardly from an upper end of said lower case member;
    a retainer disposed on the flange portion of the upper case member through a peripheral edge of opening of said air bag; and
    means for fastening together said retainer, said peripheral edge of said air bag, said flange portion of said upper case member and said flange portion of said lower case member.

2. An air bag device according to claim 1, wherein said upper case member and said lower case member are made of a metal.

3. An air bag device according to claim 1, wherein said upper case member is provided with tongue pieces which extend downwardly from an inner edge portion of said flange portion.

4. An air bag device according to claim 3, wherein said lower case member is provided with auxiliary plates coupled to an inner surface at the upper end of said lower case member, and said tongue pieces are disposed in recesses which are defined between an inner surface of said lower case member and said auxiliary plates.

5. An air bag device according to claim 4, wherein said auxiliary plates are deformable so that upon inflation of said air bag, said auxiliary plates are forced against said tongue pieces to seal the casing at a coupling portion of said case where said upper member is secured to said lower member.

* * * * *

UNITED STATES PATENT AND TRADEMARK OFFICE
CERTIFICATE OF CORRECTION

PATENT NO. : 5,366,240
DATED : November 22, 1994
INVENTOR(S) : HANABUSA, et al.

It is certified that error appears in the above-indentified patent and that said Letters Patent is hereby corrected as shown below:

On the Title page, Assignee should read as follows:
[73] Assignee: Toyoda Gosei Co., Ltd., Nishikasugai, Japan Signed and Sealed this Twenty-first Day of November, 1995

Attest:

BRUCE LEHMAN

Attesting Officer     Commissioner of Patents and Trademarks